US009207914B2

(12) United States Patent
Miadowicz et al.

(10) Patent No.: US 9,207,914 B2
(45) Date of Patent: Dec. 8, 2015

(54) EXECUTION GUARDS IN DYNAMIC PROGRAMMING

(71) Applicant: Microsoft Corporation, Redmond, WA (US)

(72) Inventors: Jedrzej Miadowicz, Redmond, WA (US); Curtis Cheng-Cheng Man, Seattle, WA (US); Louis Lafreniere, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/137,356

(22) Filed: Dec. 20, 2013

(65) Prior Publication Data

US 2015/0178051 A1 Jun. 25, 2015

(51) Int. Cl.
*G06F 9/44* (2006.01)
*G06F 9/455* (2006.01)

(52) U.S. Cl.
CPC ............... *G06F 8/31* (2013.01); *G06F 9/4431* (2013.01); *G06F 9/4552* (2013.01); *G06F 9/45504* (2013.01); *G06F 9/45529* (2013.01)

(58) Field of Classification Search
USPC .......................................... 717/118
IPC .......................................... G06F 8/61
See application file for complete search history.

(56) References Cited

U.S. PATENT DOCUMENTS

| | | | |
|---|---|---|---|
| 6,996,804 B2 | 2/2006 | Stoodley | |
| 7,493,610 B1 | 2/2009 | Onodera et al. | |
| 7,526,760 B1 | 4/2009 | Daynes et al. | |
| 8,244,775 B1 | 8/2012 | Bak et al. | |
| 8,392,881 B1 | 3/2013 | Lund et al. | |
| 8,522,222 B2* | 8/2013 | Tillmann | 717/148 |
| 8,539,463 B2 | 9/2013 | De et al. | |
| 2005/0138611 A1* | 6/2005 | Inglis et al. | 717/151 |
| 2012/0185822 A1 | 7/2012 | Lee et al. | |
| 2012/0297360 A1 | 11/2012 | Lucco et al. | |
| 2012/0311535 A1* | 12/2012 | Fanning et al. | 717/123 |
| 2013/0061128 A1 | 3/2013 | Lucco et al. | |
| 2013/0067441 A1* | 3/2013 | Lafreniere et al. | 717/139 |
| 2013/0159968 A1* | 6/2013 | Jazdzewski et al. | 717/114 |
| 2013/0205281 A1 | 8/2013 | Pizlo et al. | |
| 2013/0205282 A1 | 8/2013 | Lafreniere et al. | |
| 2013/0205285 A1 | 8/2013 | Pizlo | |

(Continued)

OTHER PUBLICATIONS

Mehrara, et al., "Dynamically Accelerating Client-side Web Applications through Decoupled Execution", In Proceedings of the 9th Annual IEEE/ACM International Symposium on Code Generation and Optimization, Apr. 2, 2011, 11 Pages.

(Continued)

*Primary Examiner* — Philip Wang
(74) *Attorney, Agent, or Firm* — Kevin Sullivan; Raghu Chinagudabha; Micky Minhas

(57) ABSTRACT

A method for executing a machine code based on a dynamic language is disclosed. An execution guard is created as a value stored in a data structure. The value is representative of an expected condition or a set of conditions for a reusable portion of the machine code. The value representative of the expected condition(s) is compared to an actual value encountered later during execution of a portion of the machine code. The reusable machine code is executed if the actual value corresponds with the value representative of the expected condition(s). The execution guard is invalidated if any of the expected conditions changes.

20 Claims, 3 Drawing Sheets

(56) References Cited

U.S. PATENT DOCUMENTS

| | | | |
|---|---|---|---|
| 2013/0205286 A1* | 8/2013 | Barraclough et al. | ........ 717/151 |
| 2013/0205388 A1 | 8/2013 | Hunt et al. | |
| 2013/0212567 A1 | 8/2013 | Fisher et al. | |
| 2013/0305230 A1 | 11/2013 | Inoue | |
| 2013/0339936 A1 | 12/2013 | Boulos et al. | |
| 2014/0181591 A1 | 6/2014 | Bijanki et al. | |
| 2015/0067658 A1 | 3/2015 | Hahnenberg | |
| 2015/0178057 A1 | 6/2015 | Miadowicz | |

OTHER PUBLICATIONS

Chang, et al., "Efficient Just-In-Time Execution of Dynamically Typed Languages via Code Specialization Using Precise Runtime Type Inference", In Technical Report ICS-TR-07-10, Retrieved on: Oct. 3, 2013, 14 pages.

Gal, et al., "Trace-based Just-in-Time Type Specialization for Dynamic Languages", In Proceedings of the ACM SIGPLAN Conference on Programming Language Design and Implementation, Jun. 15, 2009, 14 pages.

Schneider, et al., "The Efficient Handling of Guards in the Design of RPython's Tracing JIT", In Proceedings of the Sixth ACM Workshop on Virtual Machines and Intermediate Languages, Oct. 26, 2013, 10 pages.

Schilling, Thomas, "Trace-based Just-in-time Compilation for Haskell", Published on: Oct. 12, 2013, Available at: http://www.cs.uu.nl/wiki/pub/Swierstra/StudentResearchCompetition/ThomasSchilling.pdf.

"International Search Report & Written Opinion Issued in PCT Patent Application No. PCT/US2014/071003", Mailed Date: May 12, 2015, 10 Pages.

"Advances in JavaScript Performance in IE10 and Windows 8", Published on: Jun. 14, 2012, Available at: http://blogs.nnsdn.com/b/ie/archive/2012/06/13/advances-in-javascript-performance-in-ie10-and-windows-8.aspx.

Castanos, et al., "On the Benefits and Pitfalls of Extending a Statically Typed Language JIT Compiler for Dynamic Scripting Languages", In Proceedings of the ACM International conference on Object Oriented Programming Systems Languages and Applications, vol. 47, Issue 10, Oct. 19, 2012, pp. 195-212.

International Search Report and Written Opinion, PCT/US2014/068680, mailed May 11, 2015, 13 pages.

Michael Bebenita et al: "SPUR: a trace-based JIT compiler for CIL", Proceedings of the 2009 ACM Sigplan Conference on Programming Language Design and Implementation, PLDI '09, vol. 45, No. 10, Oct. 17, 2010, pp. 708-725, XP055150227, New York, New York, USA, ISSN: 0362-1340, DOI: 10.1145/1932682.1869517, ISBN: 978-1-60-558392-1.

Kazuaki Ishizaki et al: "Adding dynamically-typed language support to a statically-typed language compiler: Performance Evaluation, Analysis, and Tradeoffs", Proceedings of the 8TH ACM SIGPLAN/SIGOPS Conference on Virtual Execution Environments, Vee '12, vol. 47, Jul. 7, 2012, pp. 169-180, XP055148922, New York, New York, USA, Doi: 10.1145/2151024.2151047, ISBN: 978-1-45-031176-2.

Li, et al., "TypeCastor: Demystify Dynamic Typing of JavaScript Applications", In Proceedings of the 6th International Conference on High Performance and Embedded Architectures and Compilers, Jan. 24, 2011, pp. 55-65.

Pizlo, Filip, "Introducing the WebKit FTL JIT", Published on: May 13, 2014, retrieved from https://www.webkitorg/blog/3362/introducing-the-webkit-ftl-jit/, 14 pages.

Ahn, et al., "Improving JavaScript Performance by Deconstructing the Type System", in Proceedings of the 35th ACM SIGPLAN Conference on Programming Language Design and Implementation, Jun. 9, 2014, 12 pages.

Holzle, et al., "Optimizing Dynamically-Typed Object-Oriented Languages With Polymorphic Inline Caches", ECOOP '91 proceedings, Springer Verlag Lecture Notes in Computer Science 512, Jul. 1991, 18 pages.

Jay Conrad, "Polymorphic Inline Caches explained", retrieved from http://jayconrod.com/posts/44/polymorphic-inlinecaches-explained, Jul. 24, 2011, 3 pages.

"Type system", retrieved from http://en.wikipedia.org/wiki/Type_system, Sep. 12, 2014, 8 pages.

"Inline caching", retrieved from http://en.wikipedia.org/wiki/Inline_caching, May 11, 2014, 4 pages.

The Notice of Allowance for U.S. Appl. No. 14/490,429 mailed Apr. 22, 2015 (15 pages).

* cited by examiner

EXECUTION GUARDS IN DYNAMIC PROGRAMMING

BACKGROUND

Dynamic languages have become ubiquitous in web programming. As an example, JavaScript has become the language of choice for client-side applications because of its flexibility, ease of prototyping, and portability. As web applications become more complex, computations are increasingly being delegated to the client-side to reduce network traffic and to improve user experience. JavaScript has also become common in server-side programming, game development, and the creation of desktop applications for a variety of reasons such as JavaScript programs can be easily distributed.

In JavaScript, and other dynamic languages, variable types can be changed at runtime. Thus, dynamic language compilers, or engines, typically do not generate machine code specified for a type. Instead, dynamic language compilers typically emit a generic code, or bytecode, that is adapted to run with various type combinations. In contrast, programs written in more traditional languages, such as C or C++, include type information, and compilers can provide generalized machine code for a specified type. The bytecode from dynamic language compilers is executed through interpreters, which can be significantly slower than the execution of machine code for a specified type. Performance inefficiencies of simple dynamic language scripts are relatively unnoticeable to a user. In more computational intensive applications, however, these performance inefficiencies can adversely affect user experience.

Due in part to the ubiquity of dynamic languages in web programming, dynamic compilers or engines are being developed to reduce inefficiencies associated with executing generic code through interpreters. Some optimizing engines attempt to identify sequences of type-stable bytecode and compile them into type-specific machine code. This provides for efficient execution of the bytecode sequence while conditions remain as expected. If the engine encounters an unexpected condition, a helper routine can bailout from the type-specific machine code and return to using the interpreter for the bytecode. Mechanisms currently used to determine whether a condition is expected, however, can significantly increase overhead and reduce performance efficiency.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

This disclosure relates to a method for executing a machine code based on a dynamic language, such as JavaScript. An execution guard is created as a value stored in a data structure. The value is representative of an expected condition for a reusable portion of the machine code. The value representative of the expected condition is compared to an actual value encountered later during execution of a portion of the machine code. The reusable machine code is executed if the actual value corresponds with the value representative of the expected condition. The execution guard is invalidated if the actual value does not correspond with the value representative of the expected condition. The method can be implemented as part of an engine including a just-in-time compiler. In one example, the method is implemented in a run-time environment such as a web browser.

In many circumstances a single execution guard can be used to simultaneously check several expected conditions such as an object's type and attributes of an object's properties. If one condition is not as expected, the execution guard is invalidated for all of the conditions it is designed to check. Execution guards can be implemented when loading a property from a prototype, when adding a property or set of properties to an object, when calling or entering inline code of a method, and when constructing an object, among other uses.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
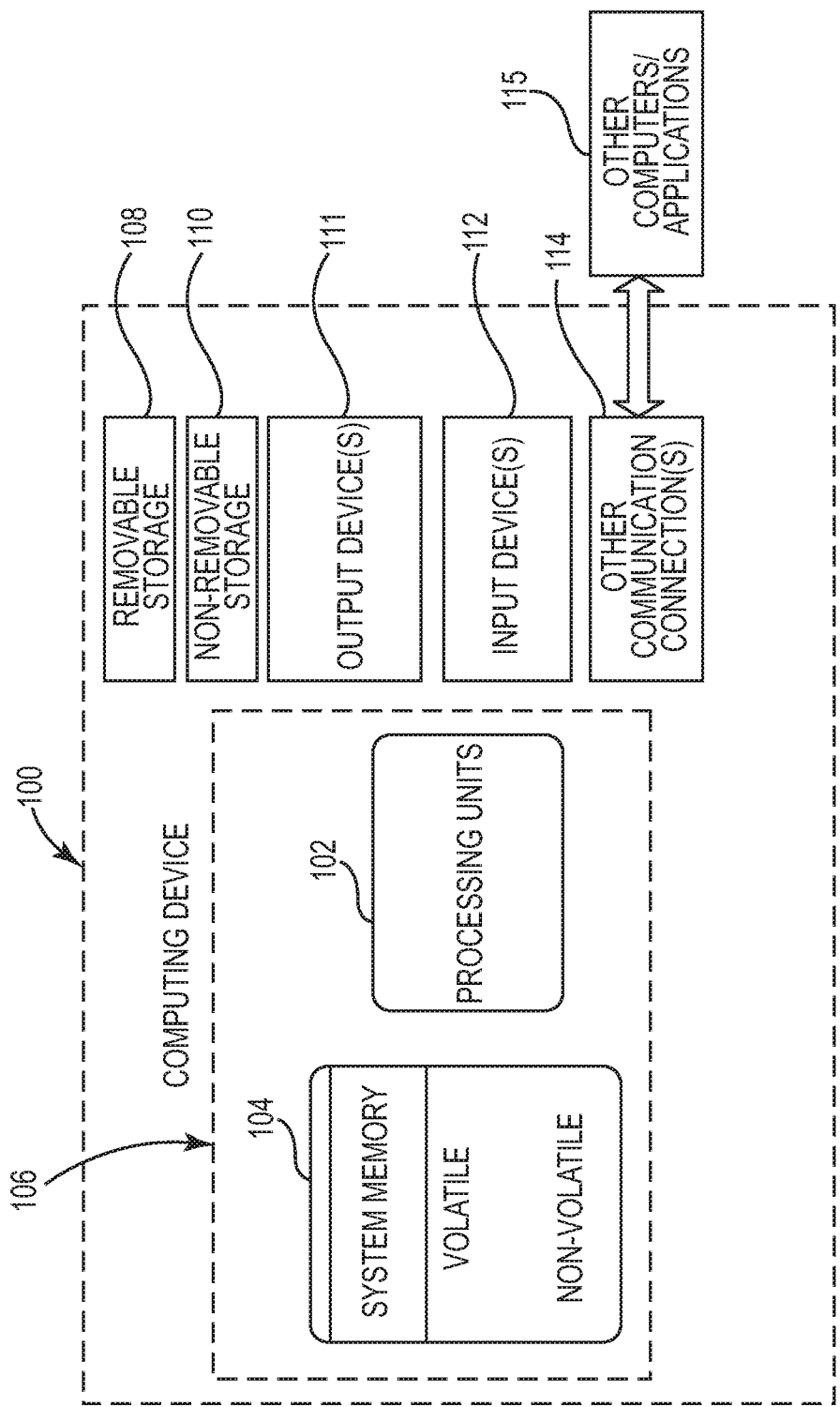
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. In a basic hardware configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. The computing device 100 can take one or more of several forms. Such forms include a tablet, a personal computer, a workstation, a server, a handheld device, a consumer electronic device (such as a video game console or a digital video recorder), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Computer storage media does not include a transitory propagating signal. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

A computer application configured to execute on the computing device 100 is typically provided as set of instructions written in a programming language, such as a dynamic programming language. The term "dynamic programming language" is used to describe a class of high-level programming languages that, at runtime, execute many common behaviors that other languages might perform during pre-runtime compilation, i.e., compile-time. These behaviors could include extension of the program, by adding new code, by extending objects and definitions, or by modifying the type system, all during program execution. In this disclosure, a dynamic programming language includes types that are associated with values, not with variables. A value is an expression that cannot be evaluated any further, and a variable is a storage location and an associated symbolic name, such as an identifier, that can contain some known or unknown quantity or information such as a value. In a dynamic language, for example, a variable could be bound to a number and then later rebound to a string. Also, a type or object system can be modified during runtime in a dynamic language as used in this disclosure. This can mean generating new objects from a runtime definition or based on mixins of existing types or objects. This can also mean changing the inheritance or type tree and altering the way that existing types behave, e.g., with respect to the invocation of methods.

Although many of the examples in this disclosure relate to JavaScript, those skilled in the art recognize that the examples can also be implemented in other dynamic programming languages. Some popular examples of dynamic languages within this definition include the forms of ECMAScript (such as ActionScript, JavaScript, and JScript), PHP, Python, Perl, Ruby, VBScript, Common Lisp, and others.

Figure 2:
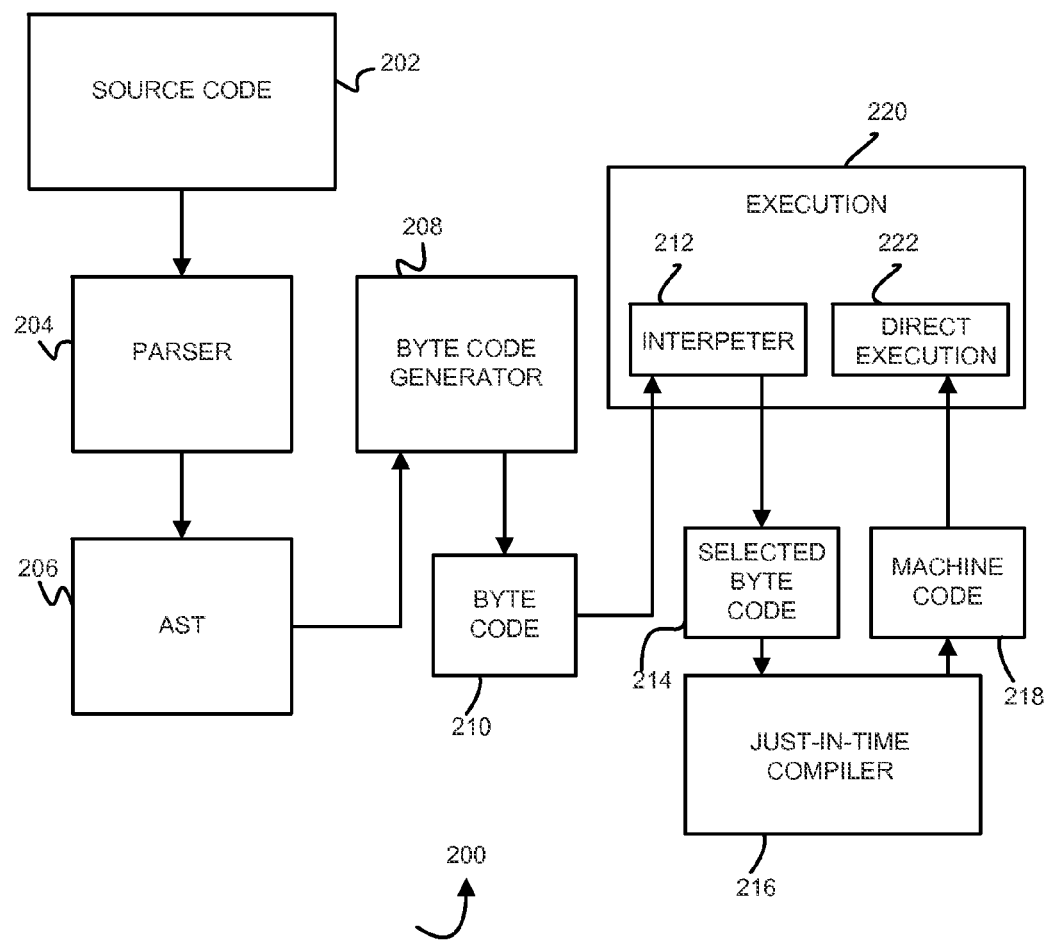
FIG. 2 is a block diagram illustrating an example dynamic language engine that can be configured to run on a computing device of FIG. 1.

FIG. 2 illustrates an example dynamic language engine 200. The engine 200 can be implemented as a web browser subsystem, a feature of the operating system, or other computer application. For example, JavaScript typically relies on a run-time environment such as a web browser, to provide objects and methods by which applications can interact with the environment, such as a webpage DOM (Document Object Model). Engine 200 includes several components that work together to process and execute a computer program written in a dynamic language, such as JavaScript code. When the engine receives a file 202, such as when a web browser downloads a JavaScript file, the contents of the file can be provided to a parser 204 to verify syntactical correctness. In one example, the parser 204 provides the one engine operation that applies to the entire file 202, and subsequent steps can be performed individually on each function including the global function. As a function is about to be executed the parser 204 builds an abstract syntax tree (AST) 206 representation of the code. The AST 206 representation is provided to a bytecode generator 208, which produces an intermediate form, such as a function bytecode 210, that is suitable for execution by an interpreter 212. In one example, the function bytecode 210 is not suitable to be directly executed by a CPU. Both the AST 206 and the function bytecode 210 may be preserved in a memory such as memory 104, so they can be reused on subsequent executions. The interpreter 212 is invoked to run the function from the bytecode. As discussed, execution of an application bytecode through an interpreter can lead to performance inefficiencies over the execution of machine code.

The engine 200 includes components to address the performance inefficiencies of executing bytecode 210. For example, as the interpreter 212 executes individual operations it also collects information in a profile about the types of inputs it encounters with the operations, keeps track of how many times the function was called, and other information useful for determining whether or how the bytecode 210 can be compiled into machine code. As the number of calls to the function reaches certain threshold, for example, the interpreter queues the particular function bytecode 214 for compilation with a compiler such as a just-in-time (JIT) compiler 216. For example, if a function is called a relatively few times, such as one or two times, the corresponding bytecode may not get compiled because the overhead expended in compilation would outweigh any performance detriment from interpretation. In one example, the JIT compiler 216 can run on a separate dedicated thread to reduce interference with script execution. The JIT compiler 216 generates optimized machine code 218 for each function in the compilation queue. Once a function is compiled the availability of the machine code 218 is signaled to the main thread. Upon the next invocation of the compiled function, the entry point to the function is redirected to the newly compiled machine code 218, and execution 220 proceeds directly on a processor 222, such as a CPU. In one example, the machine code 218 can execute concurrently with the bytecode 214.

The engine 200 can include other features. JavaScript is a managed runtime in that memory management is hidden from the developer and performed by an automatic garbage collector, which runs periodically to clean up any objects that are no longer in use. The garbage collector can include a conservative, quasi-generational, mark and sweep, garbage collector that does most of its work concurrently on a dedicated thread to minimize script execution pauses that would interrupt the user experience. The example architecture allows the engine 200 to start executing JavaScript code almost immediately during page load. Also, during periods of intense JavaScript activity, the engine can parallelize work and saturate multiple cores by running script, compiling and collecting garbage concurrently.

JIT compiler 216 generates profile-based, type-specialized machine code 218. More particularly, the JIT compiler 216 generates machine code 218 that is tailored to objects of a particular shape and values of a particular type. To emit the appropriate machine code 218, information is provided to the JIT compiler 216 to determine what types of input values to expect. For example, before a property can be added to an object, a determination is made as to whether the property is writable on all prototypes of this object. Also, before a property can be loaded from a prototype, a determination is made as to whether the prototype has not been overwritten on a more derived prototype in a chain. This information is not available in the source code of a dynamic language so the interpreter 212 is adapted to collect it at runtime in a runtime profile. When a function is scheduled for compilation, the JIT compiler 216 examines the runtime profile gathered by the interpreter 212 and emits code 218 tailored to the expected inputs based on assumptions.

While the interpreter 212 gathers information for the runs it observes, the execution of the program can lead to runtime values that violate assumptions made in the generated optimized code. Thus, for every assumption made, the JIT compiler 216 emits a runtime check, or execution guard. If a later execution results in an unexpected value, the check fails, and execution bails out of the specialized machine code and is continued in the interpreter. The reason for bailout, i.e., the failed check is recorded, and the interpreter 212 collects additional profile information. The function can eventually be recompiled with different assumptions.

Type checks or shape checks have been used as a form of execution guards. In this approach, each object is assigned a shape that encodes where in the memory of the object to locate each property. A limitation of a shape check is it can only verify the layout of an object. The shape check, for example, does not confirm whether a given property of the object is writable. Often, more than one such check must be performed such as in loading a property from a prototype in languages with prototypal inheritance.

Figure 3:
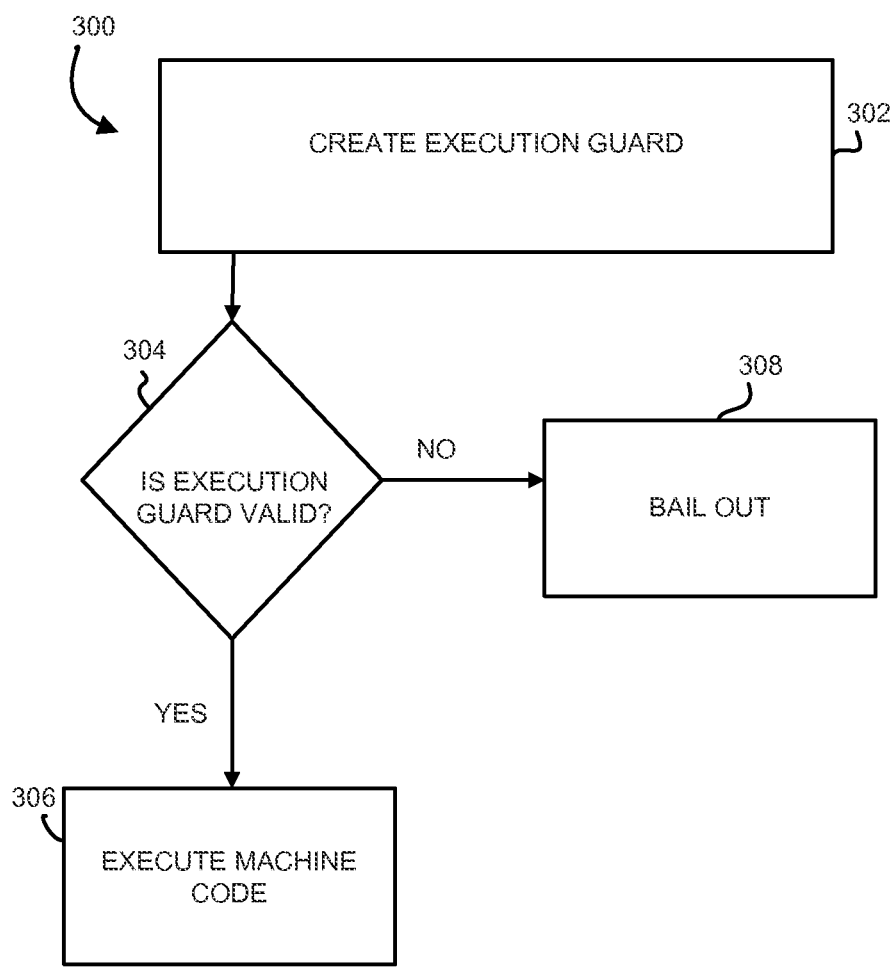
FIG. 3 is a block diagram illustrating an example method of executing a machine code compiled from a dynamic language.

FIG. 3 illustrates a process 300 for applying an execution guard. An execution guard is created as a value stored in a data structure and is representative of a given assumption, or expectation, or a set of assumptions or expectations, of an emitted specialized machine code at 302 based on the runtime profile. When the emitted specialized machine code 218 is later executed based on those assumptions, the value used in the specialized machine code 218 is compared to the value held in the corresponding execution guard to determine whether the assumed condition is still valid at 304. The execution guard is invalidated if any of the assumed conditions are changed. If the value representative of the expected condition corresponds with the actual value in the specialized machine code 218, the specialized machine code 218 is executed at 306. Alternatively, if the execution guard has been invalidated, the execution bails out of the specialized machine code at 308. An execution guard may be invalidated as a result of executing some other portion of a program, which alters one or more of the conditions assumed by the specialize machine code.

A recycler can be used to allocate guards in memory during compilation, and the address of the data structure is hard coded in the specialized machine code to allow fast access. The recycler can allocate the objects to be the guards. In one example, a predetermined slot, such as the first pointer-sized slot of the object, is used as the guard value, and the rest of the object contents can be irrelevant in the comparison. This example provides for fast object construction where the constructor cache is used as an execution guard. Using a portion of an object to hold the guard value reduces the number of memory references used to check the guard during execution. The expected value of a guard can be any value except for a selected value indicating the guard is invalid. For example, the value can be the expected type, and the selected value indicating the guard is invalid can be zero.

When the later executing code encounters the address of the guard, the value in the executing code is compared to the value at the address of the guard. A single guard can be used to check multiple conditions or multiple properties. Accordingly, a single comparison operation can be used to verify assumptions about a list of properties. This can be useful when adding several properties to an object, which is common in constructors.

If the attributes of any of the properties change, the guard is invalidated by writing a selected invalid value, such as zero, at the address of the guard. Also, a guard can be invalidated under other or additional circumstances regardless of whether the circumstance is related to a property. For example, a guard can be selectively invalidated when a constructor's prototype changes. The recycler can be used to track references to a guard from any machine code that might still require the guard. Invalidated guards remain in place for any code actively executing or code that may still be executed that still uses the guards, but no newly emitted code can refer to an invalidated guard. Instead, a new guard is allocated by the recycler for any newly generated code, such that an invalidated guard is never used by newly emitted code. This simplifies the process of ensuring no code relying on now invalid assumptions will execute. This also eliminates a demand to proactively track such code and explicitly invalidate it via some external means, which would be particularly cumbersome for such code already on the call stack. Any existing code will simply bail out once it encounters the invalidated guard such as to handler routines that can resume interpretation.

A property guard can be implemented when loading a property from a prototype. An efficient implementation of loading a property from a prototype with a dynamic language compiler is to hard code the prototype object from which to load the property. A guard can be used to check if the object still includes the property and the property has not been deleted or to check if the property has not been overwritten on a more derived prototype. Additionally, the guard can determine if the type of the object having the hard coded prototype is expected. One guard can be used to make all of these determinations.

Further, a guard can be implemented when adding a property or set of properties to an object. The guard can be used to verify the type of the object is as expected and that all the intended properties about to be added are writable on the prototype chain. Again, a single guard can make these determinations such as when the guard contains the expected type of the object and is registered for invalidation if any of the properties becomes read-only.

A guard can also be implemented when calling or entering inline code of a method. For example, the guard can be used to verify the type of the object owning the method, and that the method on the object still matches the hard-coded method. Again, this can be determined with a single guard check where the value in the guard is the type of the object and can be invalidated, such as set to zero, when the method is overwritten.

Still further, a guard can be implemented when constructing an object. In this context, it is desirable to allocate an appropriate amount of memory for the object, write properties to be added to predetermined slots, and determine whether a constructor function's prototype has not changed. This can be achieved by registering the constructor cache itself as a property guard for all properties being added by the constructor. The guard can be explicitly invalidated if the constructor's prototype is changed. At runtime, a single check is sufficient to achieve verify all of the above conditions.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A processor-implemented method for executing a machine code based on a dynamic language, including:
    creating a guard as a value stored in a data structure and representative of an expected condition for a reusable portion of the machine code with the processor;
    comparing the value representative of the expected condition to an actual value encountered later during execution of a portion of the machine code;
    executing the machine code if the actual value corresponds with the value representative of the expected condition; and
    invalidating the guard if the expected condition changes as a result of executing the machine code.

2. The method of claim 1 wherein creating the guard includes allocating an object to be the guard in memory.

3. The method of claim 2 wherein predetermined slot of the object is used as the guard.

4. The method of claim 3 wherein remaining object contents are irrelevant in the comparing of the value representative of the expected condition to an actual value encountered later during execution of a portion of the machine code.

5. The method of claim 1 wherein the comparing of the value representative of the expected condition to an actual value encountered during execution of a portion of the machine code permits simultaneous verification of multiple expectations.

6. The method of claim 1 wherein invalidation of the guard occurs if one or more of a plurality of expected conditions changes.

7. The method of claim 1 wherein invalidating of the guard includes selectively invalidating the guard.

8. The method of claim 7 wherein the invalidating of the guard occurs when the prototype of a constructor changes.

9. The method of claim 1 wherein an invalidated guard is never revalidated.

10. The method of claim 8 wherein no newly generated machine code refers to a guard once it has been invalidated.

11. The method of claim 1 wherein the invalidated guard remains in place for existing code still using the guard.

12. The method of claim 11 where existing code still using the invalidated guard is on a call stack.

13. The method of claim 11 wherein machine code encountering the invalidated guard bails out to a handler routine.

14. A computer readable storage medium storing computer executable instructions for controlling a computing device to perform a method comprising:
    creating a guard as a value stored in a data structure and representative of an expected condition for a portion of a machine code being compiled from a dynamic language;
    comparing the value representative of the expected condition to an actual value encountered during execution of a portion of the machine code;
    executing the machine code if the actual value corresponds with the value representative of the expected condition; and
    invalidating the guard if an expected condition changes as a result of executing the machine code.

15. The computer readable storage medium of claim 14 wherein the machine code is compiled from a byte code with a just in time compiler.

16. The computer readable storage medium of claim 14 wherein creating the guard includes allocating, with a recycler, an object to be the guard in memory.

17. The computer readable storage medium of claim 14 including discarding the invalidated guard from memory when the invalidated guard is no longer reference by actively executing code or code that may still be executed.

18. The computer readable storage medium of claim 14 wherein the invalidated guard remains in place for existing code corresponding with the guard.

19. A computer readable storage medium storing computer executable instructions for controlling a computing device to perform a method comprising:

creating a guard as a value stored in a data structure and representative of a set of expected conditions for a reusable portion of a machine code being compiled from a dynamic language;

comparing the value representative of the expected conditions to an actual value encountered later during execution of a portion of the machine code;

executing the machine code if the actual value corresponds with the value representative of the expected condition;

invalidating the guard if the expected condition changes as a result of executing the machine code; and discarding the invalidated guard for newly combined code wherein the invalidated guard remains in place for existing code corresponding with the guard.

20. The computer readable storage medium of claim 19 wherein the set of expected conditions includes one or more of an expected type of an object and one or more of an expected attributes of an object property.

* * * * *